US012711832B1

(12) United States Patent
Knust et al.

(10) Patent No.: US 12,711,832 B1
(45) Date of Patent: *Aug. 18, 2026

(54) SYSTEM AND METHOD FOR CASINO TABLE OPERATION

(71) Applicant: Genesis Gaming Solutions, Inc., Spring, TX (US)

(72) Inventors: Randy L. Knust, The Woodlands, TX (US); Eric Schoppe, Conroe, TX (US)

(73) Assignee: Genesis Gaming Solutions, Inc., Spring, TX (US)

( * ) Notice: Subject to any disclaimer, the term of this patent is extended or adjusted under 35 U.S.C. 154(b) by 459 days.

This patent is subject to a terminal disclaimer.

(21) Appl. No.: 17/992,665

(22) Filed: Nov. 22, 2022

Related U.S. Application Data

(63) Continuation of application No. 17/038,236, filed on Sep. 30, 2020, now Pat. No. 11,538,304, which is a continuation of application No. 16/287,704, filed on Feb. 27, 2019, now Pat. No. 10,825,288, which is a continuation of application No. 14/498,281, filed on Sep. 26, 2014, now Pat. No. 10,242,525, which is a continuation of application No. 13/297,081, filed on Nov. 15, 2011, now Pat. No. 8,896,444, which is a continuation-in-part of application No. 12/270,476, filed on Nov. 13, 2008, now Pat. No. 8,130,097.

(60) Provisional application No. 61/413,633, filed on Nov. 15, 2010, provisional application No. 60/987,570, filed on Nov. 13, 2007.

(51) Int. Cl.
*G07F 17/32* (2006.01)

(52) U.S. Cl.
CPC ........ *G07F 17/322* (2013.01); *G07F 17/3239* (2013.01)

(58) Field of Classification Search
CPC ..................................................... G07F 17/322
See application file for complete search history.

(56) References Cited

U.S. PATENT DOCUMENTS 4,378,114 A 3/1983 Sargent
4,531,187 A 7/1985 Uhland
5,451,054 A 9/1995 Orenstein
(Continued)

OTHER PUBLICATIONS

U.S. Appl. No. 14/498,281, Knust et al.
(Continued)

*Primary Examiner* — Justin L Myhr
*Assistant Examiner* — Eric M Thomas
(74) *Attorney, Agent, or Firm* — PATTERSON + SHERIDAN, LLP

(57) ABSTRACT

A system includes a gaming table, at least one light sensor, an electronic system, and a central computer. The gaming table includes a tabletop covered by a fabric. The at least one light sensor is positioned in proximity to a player position at the gaming table. In addition, the at least one light sensor is positioned beneath the fabric to detect light intensity through the fabric. The electronic system is communicably coupled to the at least one light sensor. Furthermore, the electronic system is operable to detect changes in light intensity at the at least one light sensor. The central computer is communicably coupled to the electronic system. Additionally, the central computer is operable to perform at least one operation based on a status of the at least one light sensor.

20 Claims, 7 Drawing Sheets

(56) References Cited

U.S. PATENT DOCUMENTS

| | | | |
|---|---|---|---|
| 5,649,705 | A | 7/1997 | String |
| 5,653,640 | A | 8/1997 | Shirley, Jr. |
| 5,781,647 | A | 7/1998 | Fishbine et al. |
| 5,831,527 | A | 11/1998 | Jones, II et al. |
| 5,919,090 | A | 7/1999 | Mothwurf |
| 5,957,776 | A | 9/1999 | Hoehne |
| 6,059,659 | A | 5/2000 | Busch et al. |
| 6,154,131 | A | 11/2000 | Jones et al. |
| 6,267,671 | B1 | 7/2001 | Hogan |
| 6,313,871 | B1 | 11/2001 | Schubert |
| 6,446,864 | B1 | 9/2002 | Kim et al. |
| 6,460,848 | B1 | 10/2002 | Soltys et al. |
| 6,567,159 | B1 | 5/2003 | Corech |
| 6,848,994 | B1 | 2/2005 | Knust et al. |
| 7,431,650 | B2 | 10/2008 | Kessman et al. |
| 7,690,996 | B2 | 4/2010 | Iddings et al. |
| 7,878,909 | B2 | 2/2011 | Kessman et al. |
| 8,092,293 | B2 | 1/2012 | Richards et al. |
| 8,100,753 | B2 | 1/2012 | Soltys |
| 8,130,097 | B2 | 3/2012 | Knust et al. |
| 8,480,091 | B1 | 7/2013 | Florence |
| 8,528,909 | B2 | 9/2013 | Gelinotte et al. |
| 8,636,575 | B2 | 1/2014 | Lutnick et al. |
| 8,783,688 | B2 | 7/2014 | Gelinotte et al. |
| 8,896,444 | B1 | 11/2014 | Knust et al. |
| 9,165,420 | B1 | 10/2015 | Knust et al. |
| 9,174,114 | B1 | 11/2015 | Knust et al. |
| 2001/0010025 | A1 | 7/2001 | Knust et al. |
| 2002/0072405 | A1 | 6/2002 | Soltys et al. |
| 2002/0111213 | A1 | 8/2002 | McEntee et al. |
| 2002/0123376 | A1 | 9/2002 | Walker et al. |
| 2003/0003997 | A1 | 1/2003 | Vuong et al. |
| 2003/0171143 | A1 | 9/2003 | Valdez et al. |
| 2004/0029629 | A1 | 2/2004 | Bourbour et al. |
| 2004/0172772 | A1 * | 9/2004 | Santiago ............... D06P 1/0016 8/471 |
| 2004/0182772 | A1 | 9/2004 | Dannenmaier et al. |
| 2005/0026684 | A1 | 2/2005 | Sumi et al. |
| 2005/0090310 | A1 | 4/2005 | Knust et al. |
| 2005/0093241 | A1 | 5/2005 | Lipscomb et al. |
| 2005/0236771 | A1 | 10/2005 | Soltys et al. |
| 2005/0277463 | A1 | 12/2005 | Knust et al. |
| 2005/0288083 | A1 | 12/2005 | Downs |
| 2005/0288084 | A1 | 12/2005 | Schubert |
| 2005/0288086 | A1 | 12/2005 | Schubert et al. |
| 2006/0128455 | A1 | 6/2006 | Bourbour et al. |
| 2006/0177109 | A1 | 8/2006 | Storch |
| 2006/0183540 | A1 | 8/2006 | Grauzer et al. |
| 2006/0252521 | A1 | 11/2006 | Gururajan et al. |
| 2006/0252554 | A1 | 11/2006 | Gururajan et al. |
| 2007/0045958 | A1 | 3/2007 | Rader et al. |
| 2007/0057469 | A1 * | 3/2007 | Grauzer .............. G07F 17/3232 273/309 |
| 2007/0077987 | A1 | 4/2007 | Gururajan et al. |
| 2007/0080496 | A1 | 4/2007 | Feola |
| 2007/0117604 | A1 | 5/2007 | Hill |
| 2007/0296151 | A1 | 12/2007 | Kyrychenko |
| 2008/0113767 | A1 * | 5/2008 | Nguyen .................. G07F 17/32 463/25 |
| 2008/0113772 | A1 | 5/2008 | Burrill et al. |
| 2008/0136108 | A1 | 6/2008 | Polay |
| 2008/0150234 | A1 | 6/2008 | Makieil |
| 2009/0131151 | A1 | 5/2009 | Harris et al. |
| 2009/0191933 | A1 | 7/2009 | French |
| 2009/0253498 | A1 | 10/2009 | Wolf et al. |
| 2011/0204565 | A1 | 8/2011 | Gelinotte et al. |
| 2012/0208622 | A1 | 8/2012 | Delaney et al. |

OTHER PUBLICATIONS

U.S. Appl. No. 14/215,392, Knust et al.
U.S. Appl. No. 14/043,692, Knust et al.
U.S. Appl. No. 13/842,126, Knust et al.
U.S. Appl. No. 13/842,416, Knust et al.
U.S. Appl. No. 14/855,777, Knust et al.
U.S. Appl. No. 15/353,443, Knust et al..
Parets, Robyn Taylor, "The newer Deal", International Gaming & Wagering Business, Apr. 1997, 2 pages.
Stimpson, Jennifer, "How to Build a Poker Table," This Old House, retrieved from Internet on May 31, 2015 and published Mar. 25, 2011 from <http://web.archive.org/web/20110325082217/http://www.thisoldhouse.com/toh/how-to/step/0%20%2c20474800_20926199%2c00.html#>, p. 9.

* cited by examiner

SYSTEM AND METHOD FOR CASINO TABLE OPERATION

CROSS-REFERENCE TO RELATED APPLICATIONS

This patent application is a continuation of U.S. patent application Ser. No. 17/038,236 filed on Sep. 30, 2020. U.S. patent application Ser. No. 17/038,236 is a continuation of U.S. patent application Ser. No. 16/287,704, filed on Feb. 27, 2019. U.S. patent application Ser. No. 16/287,704 is a continuation of Ser. No. 14/498,281, filed on Sep. 26, 2014. U.S. patent application Ser. No. 14/498,281 is a continuation of U.S. patent application Ser. No. 13/297,081, filed on Nov. 15, 2011. U.S. patent application Ser. No. 13/297,081 is a continuation-in-part of U.S. patent application Ser. No. 12/270,476, filed on Nov. 13, 2008, and claims priority from U.S. Provisional Application No. 61/413,633, filed on Nov. 15, 2010. U.S. patent application Ser. No. 12/270,476 claims priority from U.S. Provisional Application No. 60/987,570, filed on Nov. 13, 2007. U.S. patent application Ser. No. 17/038,236, U.S. patent application Ser. No. 16/287,704, U.S. patent application Ser. No. 14/498,281, U.S. patent application Ser. No. 13/297,081, U.S. patent application Ser. No. 12/270,476, U.S. Provisional Application No. 61/413,633, and U.S. Provisional Application No. 60/987,570 are incorporated by reference herein in their entirety.

BACKGROUND

Technical Field

The present invention relates generally to the field of gaming systems, and, more particularly, but not by way of limitation, to a system for facilitating casino table operation.

History of Related Art

The card and chip detection system described herein is designed to detect if cards or chips are placed in a certain area on a gaming table. If the casino knows where and when chips or cards are on the table, then player tracking, dealer tracking, surveillance and pit management become very accurate. The casino will know an accurate count of how many total hands are dealt for providing free compensation ("comp") and occupancy purposes. Also, dealer audits are accurate for evaluating dealer efficiency and speed. Security knows immediately when and where hands are being played for video surveillance. Unknown patrons are automatically logged into the system for tracking purposes.

The current hand or chip detection devices are generally positioned on the table on top of the table felt and may comprise a button or light sensor. This is very inefficient for maintenance reasons since every time a felt is changed the device must be disconnected and removed from the table. Damage is more likely from the device being exposed on the table top. Functionality of such known systems is also inhibited since the table top space is limited. The sensors or buttons can only be mounted in certain areas as not to affect or delay the dealing or payout of the game directly.

SUMMARY OF THE INVENTION

In one embodiment, a system includes a gaming table, at least one light sensor, an electronic system, and a central computer. The gaming table includes a tabletop covered by a fabric. The at least one light sensor is positioned in proximity to a player position at the gaming table. In addition, the at least one light sensor is positioned beneath the fabric to detect light intensity through the fabric. The electronic system is communicably coupled to the at least one light sensor. Furthermore, the electronic system is operable to detect changes in light intensity at the at least one light sensor. The central computer is communicably coupled to the electronic system. Additionally, the central computer is operable to perform at least one operation based on a status of the at least one light sensor.

In one embodiment, a method includes detecting a change in light intensity in proximity to a player position at a gaming table. The detection is performed via a light sensor positioned beneath a fabric layer on the gaming table. In addition, the detection includes detecting the change in light intensity through the fabric layer. The method further includes, at a central computer, performing at least one operation based on a status of the at least one light sensor.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
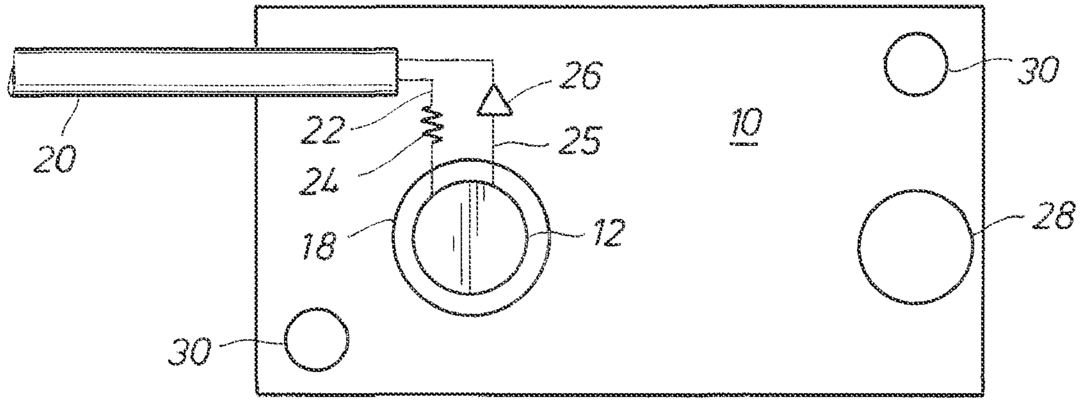
FIG. 1 is a plan schematic diagram of a chip or card detection system.

FIG. 1 illustrates a charge coupled device (CCD) light sensor board 10, in accordance with the teachings of the present invention. One such light sensor board 10 is associated with each player position around a gaming table, as shown and described below in greater detail. The CCD light sensor board 10 generally comprises a cadmium sulphide sensor 12 whose resistance changes in response to light, as powered from a cable 20 through a conductor 22. The light sensor 12 pulls against a resistance 24 to create a changing voltage point, in a manner known in the art. This changing voltage point is measured using an Analog to Digital (A/D) converter 26 through a conductor 25 and calibrated continuously to detect changes in light through fabrics and changing lighting conditions. The light sensor board 10 also contains a light-emitting diode 28 which serves as a location indicator and is optically isolated from the light sensor. The entire light sensor board assembly is preferably mounted to a gaming table beneath the table-covering felt with a set of mounting holes 30.

Figure 2:
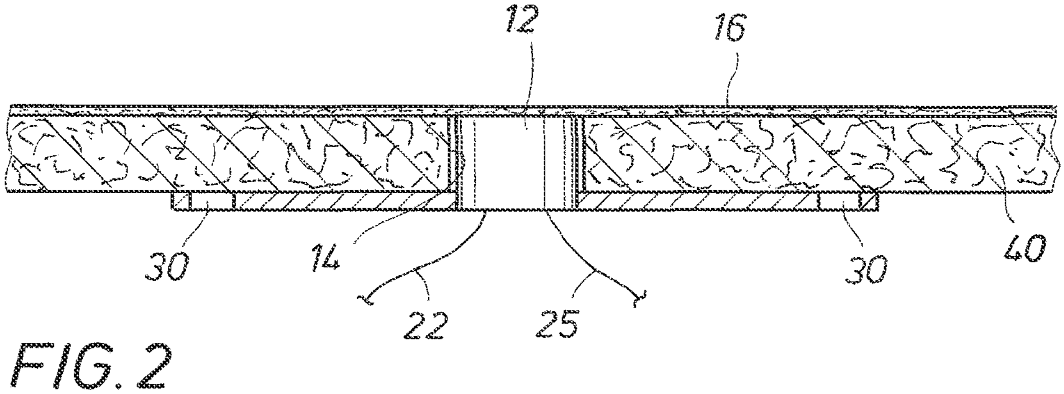
FIG. 2 is a side section view through a table top illustrating the light sensor sensing change in light energy transmitted through a table top felt on a gaming table.

As shown in FIGS. 1 and 2, a tabletop 40 includes a light sensor 12 mounted in a hole 14 in the tabletop. The light sensor 12 is mounted in such a way that it is substantially flush with the top surface of the tabletop. A felt layer 16 is installed over the tabletop over the light sensor. The light sensor senses changes in light entering the light sensor through the felt. When a new felt is installed, a registration pattern 18 FIG. 1), which is printed on the felt, is installed over the light sensor. So, when a chip or a card is placed over the sensor, or even if it just passes over the sensor, the sensor detects the change in ambient light and informs the data collection system.

Figure 3:
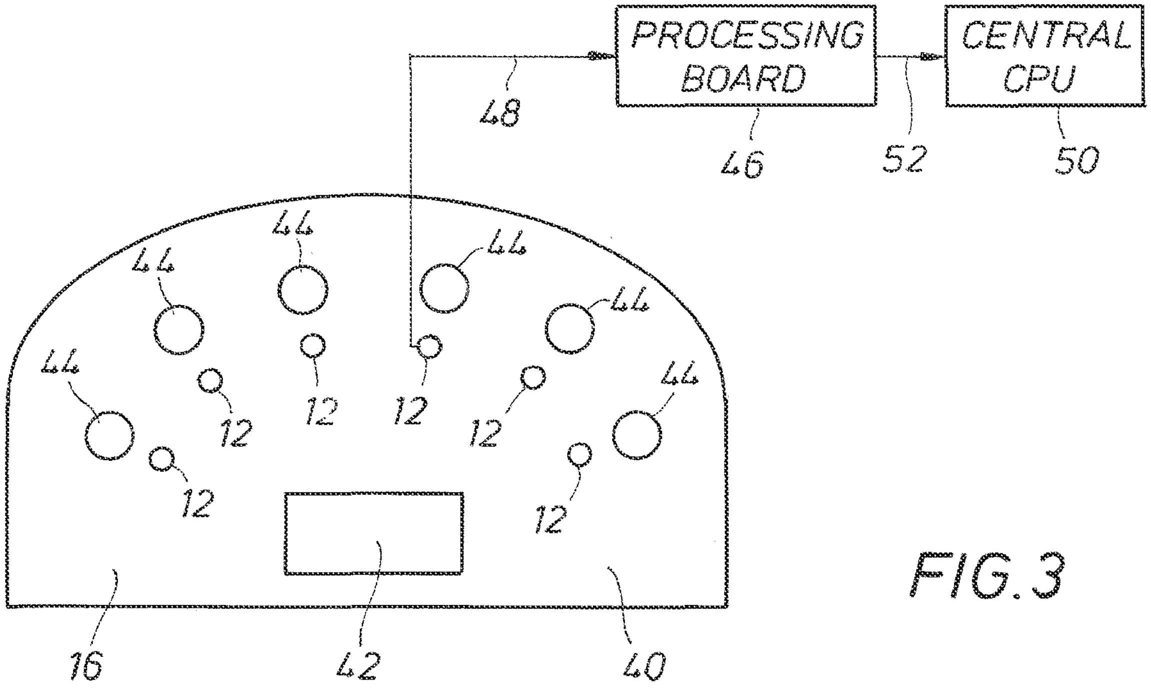
FIG. 3 is a schematic view of a data transmission portion of the system.

FIG. 3 illustrates one preferred embodiment of a reporting system using the card and chip detection system of FIGS. 1 and 2. The tabletop 40 is covered with a felt layer 16, as previously described. A dealer's position 42 is positioned along one location beside the gaming table, while a plurality of player positions 44 are arrayed in a semi-circle along the side of the table. A sensor 12 is positioned adjacent each player position.

Each of the sensors 12 is coupled electronically with a processing board 46 through a connection 48. The processing board 46 is electronically coupled to a central processing unit (CPU) 50, possibly wirelessly, through a connection 52. In various embodiments, the connection 52 includes a transceiver assigned to the table that receives data from the processing board 52 and transmits the data to the CPU 50. The transceiver may be, for example, a computing device that communicates via wired Ethernet or wirelessly. In a typical embodiment, the CPU 50 is representative of a management system such as, for example, a casino management system, and may be representative of one or more physical or virtual server computers. In a typical embodiment, the CPU 50 stores for and facilitates management of a plurality of gaming tables.

Preferably, each of the sensors 12 is monitored continuously, so that any alteration in the state of the A/D converter 26 (FIG. 1) associated with any sensor will be sensed by the processing board 46 and transmitted to the CPU and stored. This allows the proprietor to maintain an up to the minute determination of the gaming at each player position throughout the establishment, such as for example in a casino.

Figure 4:
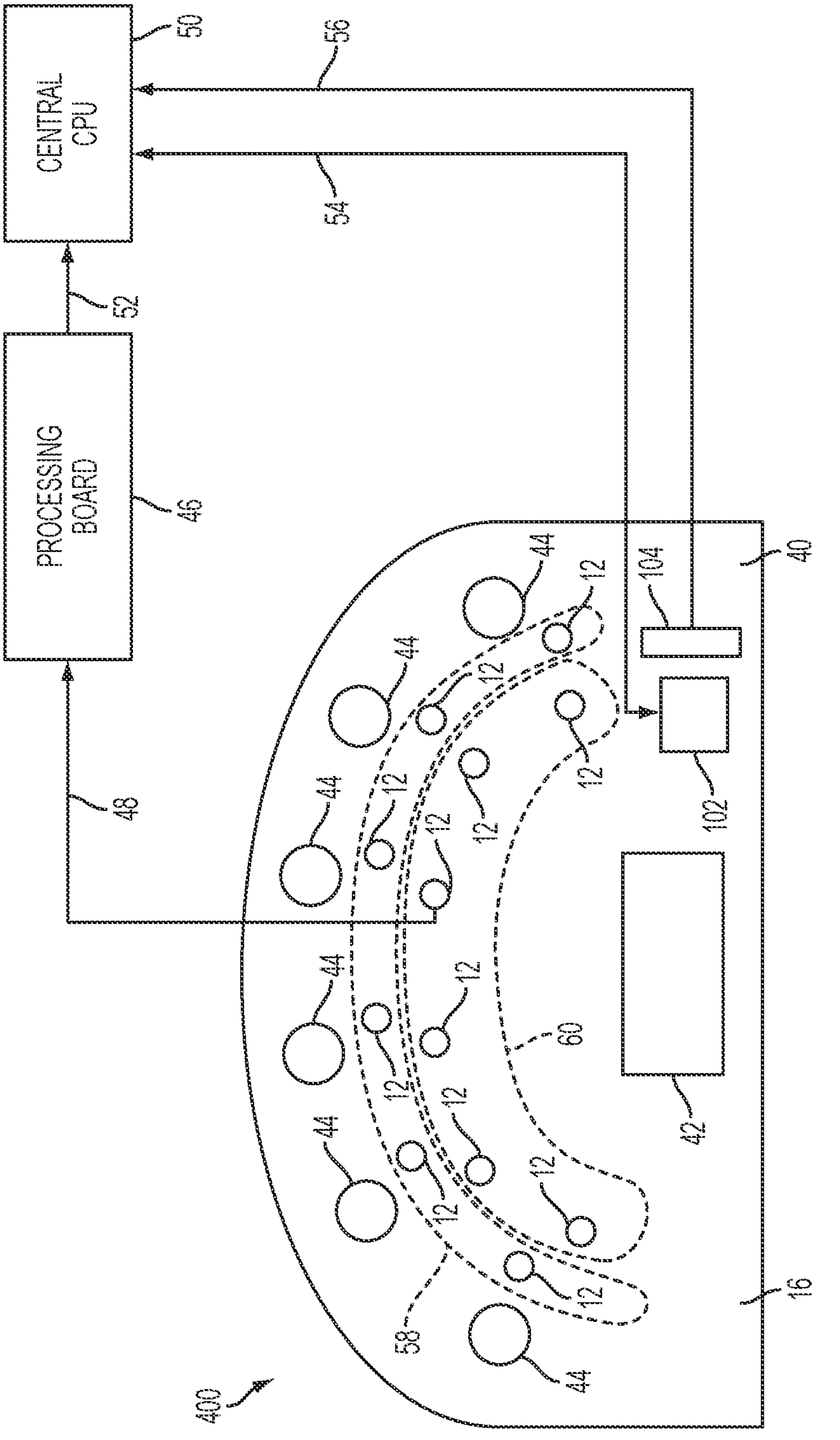
FIG. 4 is a schematic view of a data transmission portion of the system.

FIG. 4 illustrates another embodiment of a reporting system using the card and chip detection system of FIGS. 1 and 2. In particular, a gaming table 400 is illustrated. For purposes of simplicity, the sensors 12 illustrated with respect to FIG. 3 and described above are grouped together in FIG. 4 as a first group 60. A second group 58 of the sensors 12 is disposed above the first group 60 and adjacent to the player positions 44. A dealer keypad 102 and a card-reading apparatus 104 are positioned on the tabletop 40 in proximity to the dealer's position 42.

The dealer keypad 102 and the card-reading apparatus 104 are electronically coupled to the central processing unit (CPU) 50 through a connection 54 and a connection 56, respectively. In various embodiments, the connections 54 and 56 include a transceiver assigned to the table that receives and transmits data to the CPU 50. In the case of the connection 54, the transceiver may relay data intended for the dealer keypad 102 from the CPU 50 to the dealer keypad 102. The transceiver may be, for example, a computing device that communicates via wired Ethernet and/or wirelessly. In various embodiments, the connections 48, 54, and 56 may share a single transceiver.

The dealer keypad 102 and the card-reading apparatus 104 allow a dealer to practice more efficient management of players at the gaming table 400, for example, in a casino pit. Operation of the dealer keypad 102 and the card-reading apparatus 104 will be described in greater detail with respect to FIGS. 5-8.

In a typical embodiment, the sensors 12 in the second group 58 facilitate additional bets such as proposition bets (i.e. side bets). One of ordinary skill in the art will appreciate that a proposition bet refers to a bet made regarding the occurrence or non-occurrence during a game of an event not directly affecting the game's outcome. For example, during a game of blackjack, proposition bets could be established related to which cards will be dealt (e.g., a "Lucky Ladies" proposition bet that wins only if a player is dealt the queen of hearts and the dealer receives blackjack). Numerous types of proposition bets are possible and will be apparent to one of ordinary skill in the art.

In a typical embodiment, the sensors 12 in the second group 58 may be used to determine whether a proposition bet has been placed. If one or more gaming objects (e.g., chips) are placed over any of the sensors 12 in the second group 58, the alteration in the state of the A/D converter 26 (FIG. 1) associated therewith will be sensed by the processing board 46 and transmitted to the central CPU 50 and stored. In that way, the central CPU 50 stores each proposition bet and can track proposition bets and the frequency with which particular players make proposition bets. This allows the proprietor to maintain an up to the minute determination of proposition bets at each player position throughout the establishment such as, for example, in a casino.

Figure 5:
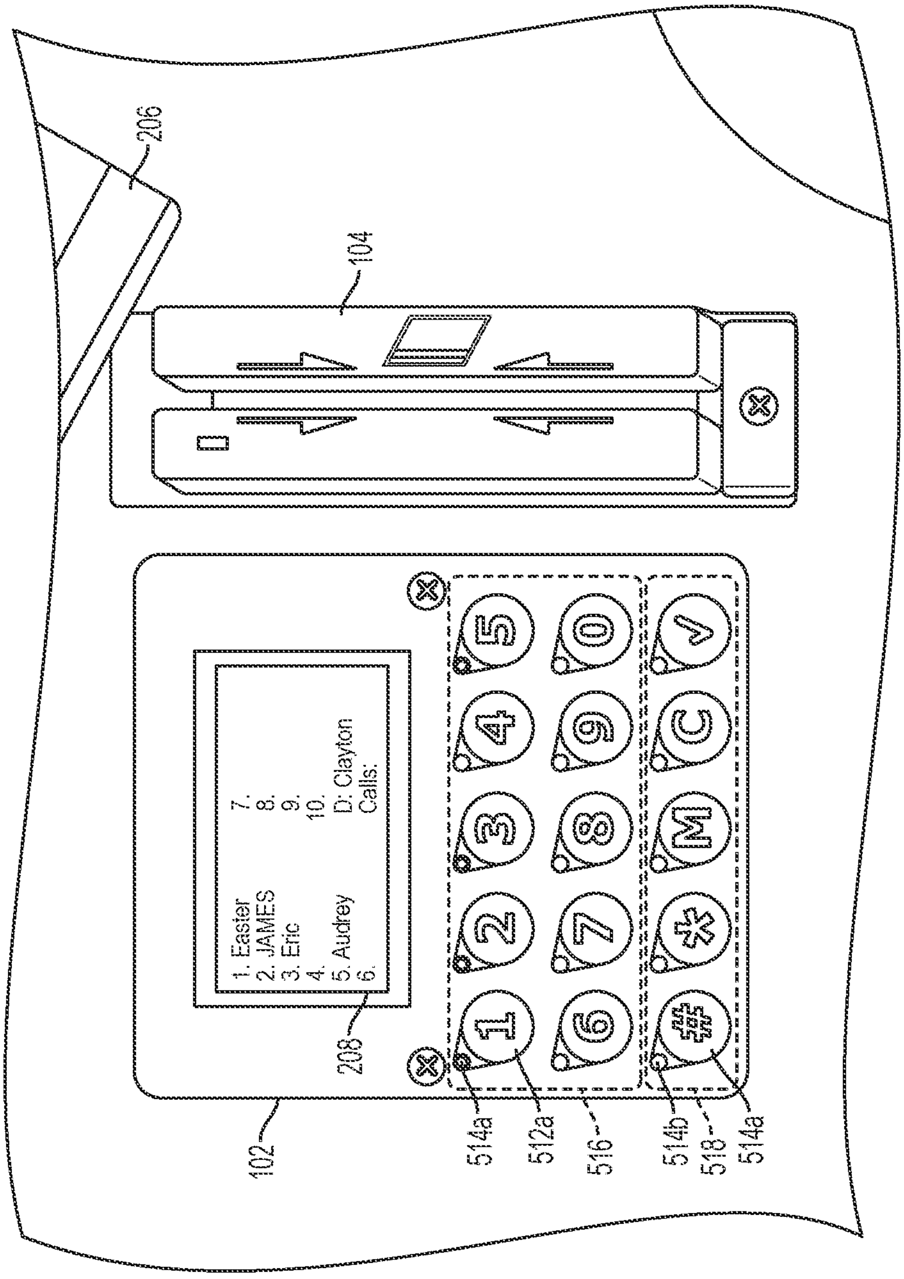
FIG. 5 illustrates a dealer keypad and a card-reading apparatus.

FIG. 5 illustrates the dealer keypad 102 and the card-reading apparatus 104 of FIG. 4 in greater detail. The dealer keypad 102 includes a display 208 that may be, for example, a liquid crystal display (LCD). The dealer keypad 102 additionally includes a numbered section 516 and a command section 518. The numbered section 516 includes a plurality of numbered buttons 512*a* and a plurality of indicator lights 514*a* that are each associated with one of the numbered buttons 512*a*. The command section 518 includes a plurality of command buttons 512*b* and a plurality of indicator lights 514*b* that are each associated with one of the command buttons 512*b*.

For simplicity of reference herein, individual buttons in the plurality of numbered buttons 512*a* or the plurality of command buttons 512*b* may be referred to by a label appearing thereon (e.g., "the numbered button 512*a* labeled '1'" or "the command button 512*b* labeled '#'"). Likewise, for simplicity of reference, individual indicator lights in the plurality of indicator lights 514*a* or the plurality of indicator lights 514*b* may be individually pointed out with reference to an associated button from the plurality of numbered buttons 512*a* or the plurality of command buttons 512*b*, respectively (e.g., "the indicator light 514*a* associated with the numbered button 512*a* labeled '1'" or "the indicator light 514*b* associated with the command button 512*b* labeled '#'"). Finally, for further simplicity, individual indicator lights from the plurality of indicator lights 514*a* or the plurality of indicator lights 514*b* may be individually pointed out solely with reference to a label appearing on a button with which it is associated (e.g., "the indicator light 514*a* associated with '1'" or "the indicator light 514*b* associated with '#'").

In general, numbers that appear on the plurality of numbered buttons 512*a* correspond to a player position such as, for example, one of the plurality of player positions 44. For example, with reference to FIG. 4, each of the plurality of player positions 44 can be assigned a position number from one to six (e.g., from left to right from the dealer's perspective). With reference to FIG. 5, the display 208 indicates, by way of example, that position numbers one, two, three, and five are occupied while position numbers four and six are vacant. In a typical embodiment, the dealer keypad 102 additionally represents table occupancy by causing indicator lights 514*a* associated with occupied player positions to be lit. For purposes of the example depicted in FIG. 5, the dealer keypad 102 lights the indicator lights 514*a* associated with the numbered buttons 512*a* labeled '1', '2', '3', and '5'.

Still referring to FIG. 5, the card-reading apparatus 104 is typically operable to accept, for example, a card having a magnetic stripe 206 disposed thereon. In a typical embodiment, the magnetic stripe 206 includes information that uniquely identifies, for example, a player. The information can be used to access biographical or historical data regarding the player. For example, in operation, the card may be oriented so that the magnetic stripe 206 faces left on the card-reading apparatus 104 and is swiped in a downward direction.

Exemplary functionality of the dealer keypad 102 will now be described. In various embodiments, the dealer keypad 102 facilitates dealer check-in functionality. Prior to a dealer being checked-in, operation of the dealer keypad 102 is typically locked. To check-in, the dealer swipes an employee card using the card-reading apparatus 104. With reference to FIG. 4, the card-reading apparatus 104 transmits identification information gleaned from the employee card to the CPU 50 via the connection 56. The central CPU 50 registers the dealer for the gaming table 400 and returns the registration to the dealer keypad 102 via the connection 54. At the dealer keypad 102, the indicator light 514*b* associated with the command button 512*b* labeled '✓' becomes lit. After the dealer presses the command button 512*b* labeled '✓', the associated indicator light 514*b* turns off and the dealer's name appears on the display 208. At that point, functionality is unlocked and the dealer is enabled to operate the dealer keypad and perform, for example, the functionality described below.

In various embodiments, the dealer keypad 102 facilitates player check-in functionality. In various embodiments, the dealer keypad 102 enables player check-in with or without a cash buy-in. Exemplary functionality for checking-in a player without a cash buy-in will be described first.

To check-in a player without a cash buy-in, the dealer swipes a player card using the card-reading apparatus 104. With reference to FIG. 4, the card-reading apparatus 104 transmits identification information gleaned from the player card to the CPU 50 via the connection 56. The CPU 50 subsequently indicates to the dealer keypad 102 that a player-registration process is occurring and the dealer keypad 102 causes the indicator light 514*b* associated with the command button 512*b* labeled '□' to become lit. At this point, the dealer presses the command button 512*b* labeled '□' again and then presses the numbered button 512*a* labeled with a desired position number at the gaming table 400 (e.g., '1', '2', '3', etc.).

In some embodiments, a buy-in interface may appear on the display 208. In these embodiments, the dealer presses the command button 512*b* labeled '✓' again to exit the buy-in interface. The desired position number and the buy-in amount (i.e., zero) are transmitted to the CPU 50 via the connection 54. Then, the CPU 50 confirms the player registration and transmits a desired alias such as, for example, the player's first name, to the dealer keypad 102. At this point, the player's alias (received from the CPU 50) appears on the display 208 in connection with the desired position number at the gaming table 400. Also, the dealer keypad 102 causes the indicator light 514*a* associated with the desired position number to become lit.

Operation of the dealer keypad 102 to facilitate player check-in with a cash buy-in will now be described. Player check-in with a cash buy-in proceeds as described above with respect to player check-in without a cash buy-in except that the dealer does not immediately exit the buy-in interface. The buy-in interface on the display 208 allows the dealer to enter a buy-in amount as cash, chips, or marker. In a typical embodiment, the buy-in interface on the keypad 102 defaults to cash but can be toggled to chips or marker by pressing, for example, the command button 512*b* labeled '*'. In a typical embodiment, the dealer toggles between cash, chips, and marker as appropriate to select the appropriate type of buy-in.

To simplify buy-in entry, in some embodiments, the dealer keypad 102 may utilize a multiplier such as, for example, one-hundred, so that a $200 buy-in amount could be entered by pressing the numbered button 512*a* labeled '2'. In these embodiments, if the buy-in amount is not compatible the multiplier (e.g., the buy-in amount is not a multiple of one-hundred), the dealer can press, for example, the command button 512*b* labeled '#' and enter the exact amount via the numbered buttons 512*a*.

After the buy-in amount is entered, the dealer presses, for example, the command button 512*b* labeled '□', to indicate completion. The desired position number and the buy-in amount are transmitted to the CPU 50 via the connection 54. Then, the CPU 50 confirms the player registration and transmits a desired alias such as, for example, the player's first name (received from the CPU 50), to the dealer keypad 102. At this point, the player's alias appears on the display 208 in connection with the desired position number. Also, the dealer keypad 102 causes the indicator light 514*a* associated with the desired position number to become lit.

In various embodiments, the keypad 102 additionally enables the dealer to check-in a player who does not have a player card as a guest. To check-in a player who does not have a player card, the dealer presses, for example, the command button 512*b* labeled '✓', which causes the associated indicator light 514*b* to become lit. The guest can be checked-in either with or without a buy-in as described above with respect to players with player cards. Subsequently, the keypad 102 notifies the CPU 50 of the guest's registration and transmits the guest's desired position number and any buy-in amount. Then, the CPU 50 confirms the guest registration and transmits an alias such as, for example, "guest," to the dealer keypad 102. At this point, the alias appears on the display 208 in connection with the guest's desired position number. Also, the indicator light 514*a* associated with the guest's desired position number becomes lit.

In various embodiments, the keypad 102 additionally enables the dealer to enter an average bet for players at the gaming table 400. In a typical embodiment, the average bet is utilized, for example, to calculate player ratings for purposes of determining comps. To enter an average bet, the dealer presses, for example, the command button 512*b* labeled '*' and presses the numbered button 512*a* that is labeled with the appropriate player position number. Subsequently, the dealer enters the average bet amount via the numbered buttons 512*a* and presses, for example, the command button 512*b* labeled '✓' to indicate completion. The entered average bet amount is transmitted to the CPU 50 via the connection 54.

In various embodiments, the dealer keypad 102 enables the dealer to perform player check-out functionality. In a typical embodiment, players (and guests) can be checked-out from the gaming table with or without a walk-with amount. If a player is being checked-out without a walk-with amount, the dealer can press, for example, the command button 512*b* labeled '✓' followed by the numbered button 512*a* labeled with the player's position number. Subsequently, the dealer keypad 102 notifies the CPU 50 and receives a confirmation from the CPU 50 that the player is checked-out. At that point, the indicator light 514*a* associated with the player's position number turns off and the player's name is removed from the display 208.

If the player is being checked-out with a walk-with amount, the dealer can press, for example, the command button 512*b* labeled '✓' followed by the numbered button 512*a* labeled with the player's position number. Subsequently, the dealer enters an amount that the player is leaving the table with (i.e., a walk-with amount) using appropriate buttons from the numbered buttons 512*a*. Once the walk-with amount is entered, the dealer presses, for example, the command button 512*b* labeled '✓' and the dealer keypad 102 notifies the CPU 50. Once the dealer keypad 102 receives confirmation from the CPU 50 that the player is checked-out, the indicator light 514*a* associated with the player's position number turns off and the player's name is removed from the display 208.

In various embodiments, the dealer keypad 102 enables the dealer to perform lobby functionality. For example, if a player gets up to take a break (i.e. lobbying), the dealer logs the player as temporarily away by pressing, for example, the numbered button 512*a* corresponding to the player's position number. In a typical embodiment, the indicator light 514*a* associated with the player's position number flashes to indicate that the player is lobbying. The player's status of lobbying is reported to the CPU 50. In this manner, the player's position at a gaming table is reserved but the player is not credited for time or hands when the player is not at the gaming table. In this manner, over-comping of players based on time not spent at the gaming table can be prevented. When the player returns, the dealer can again press the numbered button 512*a* corresponding to the player's position number and the indicator light 514*a* associated with the player's position number stops flashing.

In various embodiments, the dealer keypad 102 additionally enables the dealer to move players from one position number to another position number when, for example, a player desires to move to a different position at a gaming table. In various embodiments, the dealer can accomplish a move of the player via a three-button sequence. In particular, the dealer can press the command button 512*b* labeled 'M', the numbered button 512*a* corresponding to the player's current position number, and the numbered button 512*a* corresponding to the player's new position number. Then, the dealer keypad 102 notifies the CPU 50 of the move. Upon receipt of confirmation from the CPU 50, the dealer keypad 102 updates the display 208 to reflect the player's name at the new position number.

In various embodiments, the dealer keypad 102 also enables the dealer to more efficiently accommodate players that are playing at more than position number. Specifically, the dealer keypad 102 permits the dealer to copy a player's information from one position number to a second position number that will be occupied by the same player. In a typical embodiment, a copy can be accomplished via a three-button sequence. In particular, the dealer can press the command button 512*b* labeled 'C', the numbered button 512*a* corresponding to the player's current position number, and the numbered button 512*a* corresponding to the player's additional position number. At that point, the dealer keypad 102 notifies the CPU 50 of the copy. Upon receipt of confirmation from the CPU 50 that the copy has been accomplished, the dealer keypad 102 updates the display 208 to show the player's name at the additional position number.

In various embodiments, the dealer keypad 102 further enables the dealer to input additional cash buy-in for a player. To enter additional cash buy-in, the dealer can press, for example, the command button 512*b* labeled '#' followed by the numbered button 512*a* corresponding to the player's position number. Then, the dealer keypad provides a buy-in interface to the dealer. After receiving the additional buy-in amount in a manner similar to that described above with respect to player check-in, the dealer can press, for example, the command button 512*b* labeled '□' to indicate completion. At that point, the dealer keypad 102 sends the additional buy-in amount to the CPU 50 via the connection 54.

Figure 6:
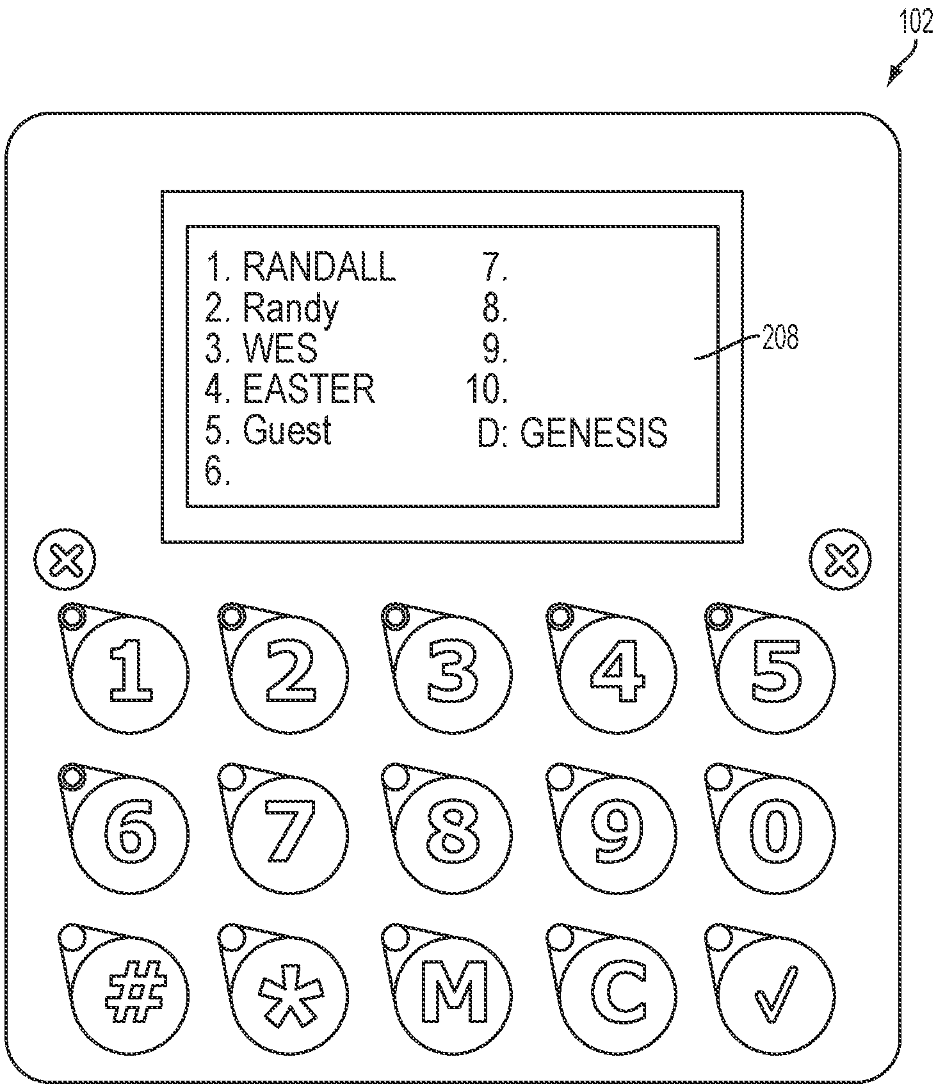
FIG. 6 provides another view of a dealer keypad.

FIG. 6 provides another view of the dealer keypad 102. For example, the display 208 illustrates a player checked-in as a guest.

Figure 7:
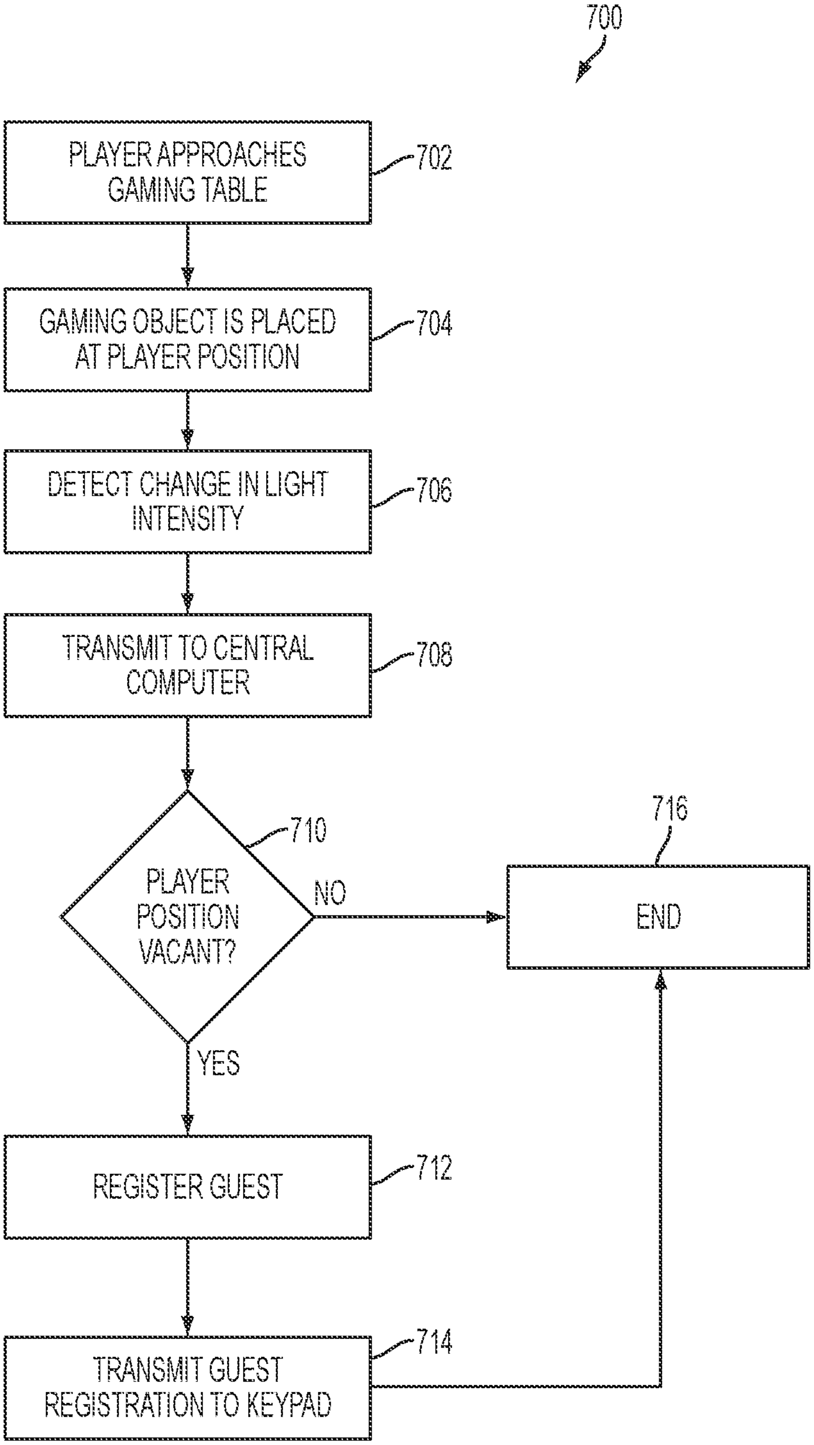
FIG. 7 illustrates a process for automatically checking-in a player as a guest.

FIG. 7 illustrates a process 700 for automatically checking-in a player as a guest. In contrast to the procedures described above with respect to FIGS. 5 and 6, the process 700 does not require data entry by a dealer. The process 700 begins at step 702. At step 702, a player approaches a player position such as, for example, one of the player positions 44 of FIG. 4. From step 702, the process 700 proceeds to step 704.

At step 704, a gaming object is placed at the player's player position. For example, the dealer may deal one or more cards to the player's position. From step 704, the process 700 proceeds to step 706. At step 706, with respect to FIG. 4, a sensor from the first group 60 that corresponds to the player's position detects a change in light intensity. From step 706, the process 700 proceeds to step 708. At step 708, the alteration in the state of the A/D converter 26 (FIG. 1) associated therewith is sensed by the processing board 46 and transmitted to the central CPU 50. From step 708, the process 700 proceeds to step 710.

At step 710, the CPU 50 determines whether the player's position is vacant. If not, the process 700 proceeds to step 716 and ends. Otherwise, the process 700 proceeds to step 712. At step 712, the CPU 50 registers a guest at the player's position at the gaming table 400. From step 712, the process 700 proceeds to step 714. At step 714, the CPU 50 transmits the guest registration to the dealer keypad 102 via the connection 54. The dealer keypad 102 then displays the name "guest" for the number associated with the player's position.

In various embodiments, the process 700 provides numerous advantages over manual check-in procedures. Via automatic guest check-in, players are more easily integrated into a gaming table and can immediately begin having activities recorded that can result in comps. Furthermore, guest check-in can occur without the dealer stopping to perform a manual task. Therefore, more hands can be dealt and more money can potentially be made at a casino. Additionally, in various embodiments, via a dealer keypad such as, for example, the dealer keypad 102 of FIG. 4, the dealer can convert a guest to that of a registered player. Once the dealer identifies the guest as a player via, for example, a card swipe, the CPU 50 can apply the activities recorded as a guest to the registered player for purposes of potential comping.

Figure 8:
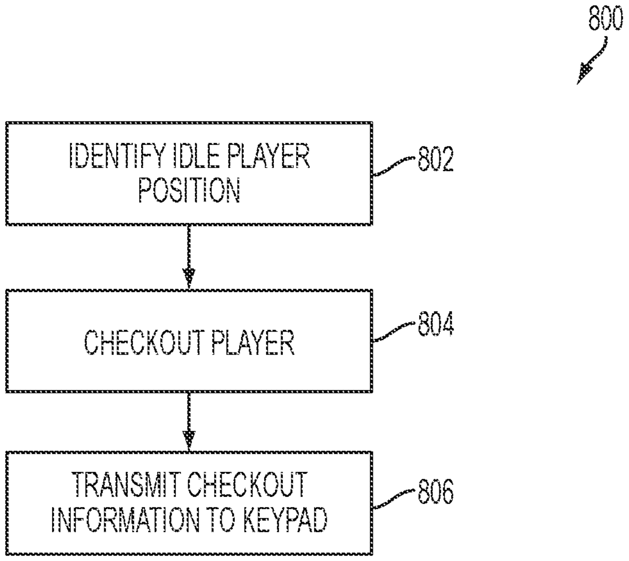
FIG. 8 illustrates a process for automatically checking-out a player from a gaming table.

FIG. 8 illustrates a process 800 for automatically checking-out a player (or guest) from a gaming table. In contrast to the procedures described above with respect to FIGS. 5 and 6, the process 800 does not require data entry by a dealer. The process 800 begins at step 802. At step 802, the CPU 50 identifies an idle player position. In a typical embodiment, a player position is determined to be idle if there is a player checked-in at the player position, the player is not in "lobby" as described above, and no gaming activity has occurred for a configurable period of time. For example, for a game of blackjack, it may be determined that no gaming activity has occurred if no hands have been dealt to the player position during the configurable period of time but hands have been dealt to other player positions. In various embodiments, the configurable period of time may be customized for a given establishment such as, for example, a casino.

From step 802, the process 800 proceeds to step 804. At step 804, the CPU 50 checks-out the player from the gaming table. From step 804, the process 800 proceeds to step 806. At step 806, the CPU 50 transmits check-out information to the dealer keypad 102. At that point, the dealer keypad 102 updates the display 208 to reflect that the idle player position is now vacant. After step 806, the process 800 ends.

In various embodiments, the process 800 serves to prevent potential over-comping at gaming tables. For example, until checked-out, a player who is checked-in at a gaming table (but not in "lobby") may continue to be given credit for receiving hands at the gaming table. By checking out the player after a configurable period of time, over-comping can thereby be prevented.

Figure 9:
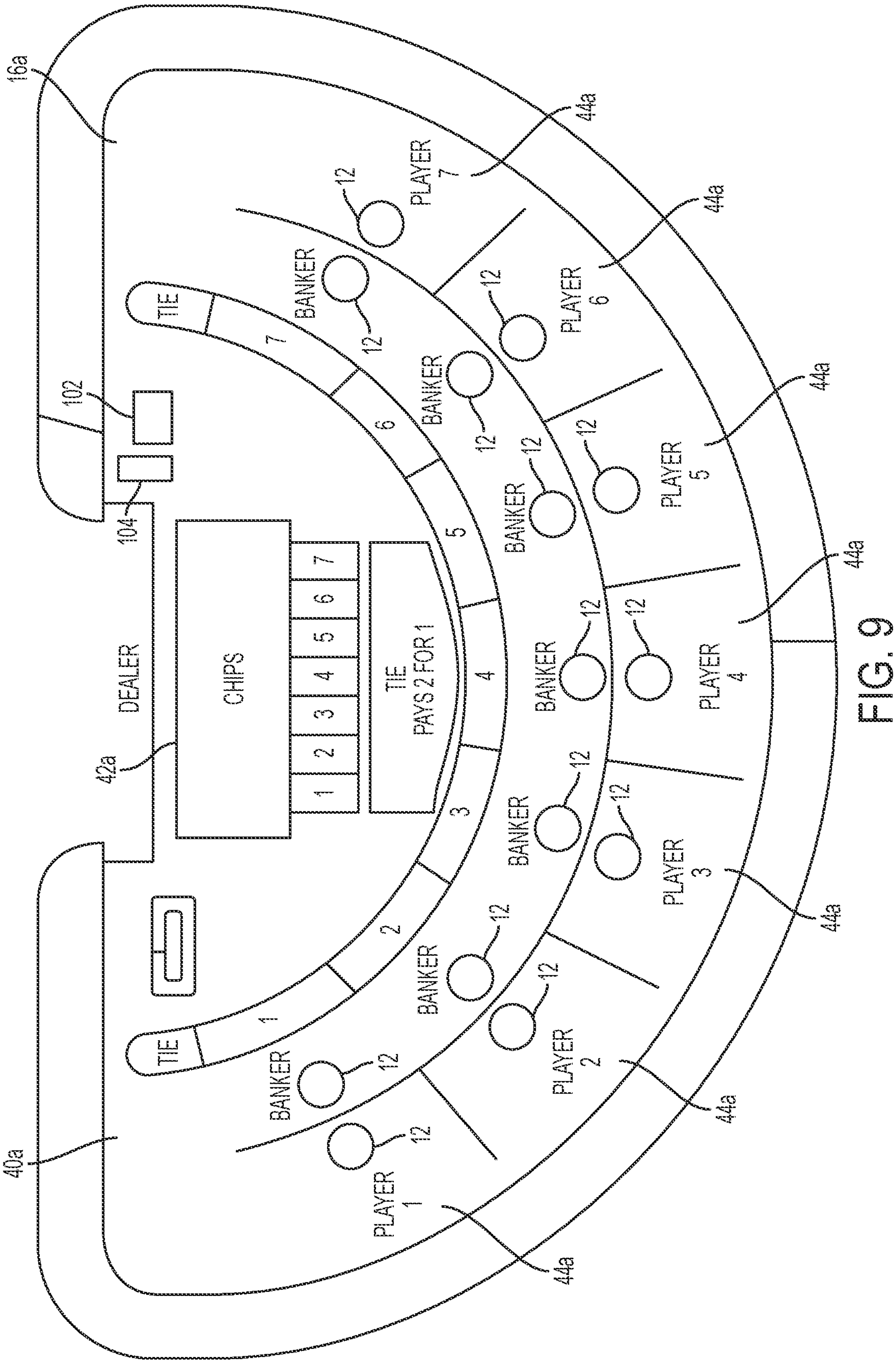
FIG. 9 illustrates an embodiment of a reporting system using card and chip detection systems.

FIG. 9 illustrates another embodiment of a reporting system using card and chip detection systems similar to those described with respect to FIGS. 1-4. A mini-baccarat tabletop 40*a* is covered with a felt layer 16*a*, as previously described with respect to the tabletop 40 and the felt layer 16 of FIGS. 2-4. A dealer's position 42*a* is positioned along one side of the tabletop 40*a*, while a plurality of player positions 44*a* are arrayed in a semi-circle along an opposite side the tabletop 40*a*. The tabletop 40*a* additionally includes the dealer keypad 102 and the card-reading apparatus 104 adjacent to the dealer position 42*a*.

Consistent with the game of baccarat, each of the player positions 44*a* provides a betting location for a "banker" bet and a betting location for a "player" bet. Two sensors 12 are positioned in proximity to each of the player positions 44*a* for purposes of accommodating and detecting each type of bet.

One of ordinary skill in the art will appreciate that baccarat games are often planned by junkets. Junkets serve to organize players that will play baccarat at one or more baccarat tables in casino. Casinos generally compensate junkets by offering a percentage commission that is calculated based on a total sum of money that is put at risk at the baccarat table. In other words, the more money that is bet (either banker or player), the more money the junket can garner.

One scam that sometimes occurs at junket-organized baccarat games involves "balanced betting." Balanced betting in baccarat refers to a practice of betting approximately equal amounts for both player and banker. Balanced betting can be practiced by an individual player or by multiple players acting in concert. When balanced betting is practiced in concert by all players at a baccarat table, very large sums of money can be bet at greatly reduced risk due to the at least partially offsetting nature of the cumulative bets. Historically, some junkets have recruited players and organized games for the purpose of artificially driving up the total money at risk and increasing the junket's commission. As a result, casinos generally prohibit balanced betting at junket-organized baccarat games.

With reference to FIG. 9, the sensors 12 operate as described with respect to FIGS. 1-4. Thus, although not specifically shown in FIG. 9, the sensors communicate with the processing board 46 and the central CPU 50 as described with respect to FIGS. 3 and 4. In a typical embodiment, the sensors 12 depicted in FIG. 9 are used to determine when a banker bet or a player bet has been placed at one of the player positions 44.

If one or more gaming objects (e.g., chips) are placed over any of the sensors 12 of FIG. 9, the alteration in the state of the A/D converter 26 (FIG. 1) associated therewith will be sensed by the processing board 46 and transmitted to the central CPU 50 and stored. In that way, the central CPU 50 stores each bet and thus can determine a total number of "banker" bets and a total number of "player" bets for a hand. Therefore, the CPU 50 is operable to determine whether a potential balanced-betting situation is present. In a typical embodiment, the CPU 50 determines a potential balanced-betting situation to be present when a total number of "player" bets equals a total number of "banker" bets. If that occurs, in a typical embodiment, the CPU 50 may cause a silent alarm to be sounded or send a notification to the dealer keypad 120. In that way, closer scrutiny may be given to the betting and gaming security may be improved.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

What is claimed is:

1. A system comprising:

a table including a tabletop covered by a fabric;

a plurality of light sensors positioned beneath the fabric, each light sensor positioned in proximity to a respective occupant position at the table and operable to detect light intensity through the fabric;

an electronic system communicably coupled to the plurality of light sensors, the electronic system operable to detect changes in light intensity at the plurality of light sensors; and a computer communicably coupled to the electronic system, wherein the computer:

receives information related to detected changes in light intensity at the plurality of light sensors;

determines that an occupant position is inactive based on an absence of detected changes in light intensity at a light sensor of the plurality positioned in proximity to the occupant position while detected changes in light intensity occur at one or more other light sensors of the plurality positioned in proximity to one or more other occupant positions; and responsive to determining that the occupant position is inactive, modifies an occupancy status associated with the occupant position.

2. The system of claim 1, wherein modifying the occupancy status comprises checking out a registered occupant associated with the occupant position.

3. The system of claim 1, wherein the determination that the occupant position is inactive is based on a determination that no changes in light intensity at the light sensor positioned in proximity to the occupant position have been reported for a predetermined period of time.

4. The system of claim 1, wherein the electronic system is operable to detect placement of an object over one or more of the plurality of light sensors.

5. The system of claim 1, wherein the fabric is felt.

6. The system of claim 1, wherein the plurality of light sensors are substantially flush with a top surface of the tabletop.

7. A system comprising:

a table including a plurality of predetermined occupant positions;

a plurality of light sensors, each light sensor positioned in proximity to a respective occupant position of the plurality of predetermined occupant positions at the table and operable to detect light intensity;

an electronic system communicably coupled to the plurality of light sensors, the electronic system operable to detect changes in light intensity at the plurality of light sensors; and a computer communicably coupled to the electronic system, wherein the computer:

receives information related to detected changes in light intensity at the plurality of light sensors;

determines that an occupant position is inactive based on an absence of detected changes in light intensity at a light sensor of the plurality of light sensors positioned in proximity to the occupant position while detected changes in light intensity occur at one or more other light sensors of the plurality of light sensors positioned in proximity to one or more other occupant positions; and responsive to determining that the occupant position is inactive, modifies an occupancy status associated with the occupant position.

8. The system of claim 7, further comprising a display device communicably coupled to the computer and positioned in proximity to the table.

9. The system of claim 8, wherein: modifying the occupancy status comprises checking out a registered occupant associated with the occupant position.

10. The system of claim 9, wherein the computer:

transmits information related to the check-out to the display device for display.

11. The system of claim 10, wherein, responsive to the transmitting, the display device indicates a vacancy at the occupant position.

12. The system of claim 10, wherein the determination that the occupant position is inactive is based on a determination that no changes in light intensity at the light sensor positioned in proximity to the occupant position have been reported for a predetermined period of time.

13. The system of claim 8, wherein the display device:

receives information related to a move of a first occupant from a first occupant position of the plurality of predetermined occupant positions to a second occupant position of the plurality of predetermined occupant positions;

transmits the information related to the move to the computer;

receives confirmation from the computer that the move has been recorded; and updates a display on the display device responsive to the received confirmation.

14. The system of claim 8, wherein the display device:

receives information related to an additional occupant position of the plurality of predetermined occupant positions that will be occupied by an existing occupant at least one existing occupant position of the plurality of predetermined occupant positions;

transmits the information related to the additional occupant position to the computer;

receives confirmation from the computer that a copy has been recorded; and updates a display on the display device responsive to the received confirmation.

15. The system of claim 8, wherein the display device comprises a keypad.

16. The system of claim 7, wherein the plurality of light sensors are substantially flush with a top surface of the table.

17. The system of claim 7, wherein the plurality of light sensors are each positioned beneath a covering over a top surface of the table and detect the light intensity through the covering.

18. The system of claim 7, wherein the electronic system is operable to detect placement of an object over one or more of the plurality of light sensors.

19. A method comprising:

receiving, by a computer system, information related to detected changes in light intensity at a plurality of light sensors, wherein the plurality of light sensors are each positioned in proximity to a respective occupant position of a plurality of predetermined occupant positions at a table;

determining, by the computer system, that an occupant position is inactive based on an absence of detected changes in light intensity at a light sensor of the plurality of light sensors positioned in proximity to the occupant position while detected changes in light intensity occur at one or more other light sensors of the plurality of light sensors positioned in proximity to one or more other occupant positions; and responsive to determining that the occupant position is inactive, the computer system modifying an occupancy status associated with the occupant position.

20. The method of claim 19, wherein modifying the occupancy status comprises checking out a registered occupant associated with the occupant position.

* * * * *